Patented Mar. 11, 1941

2,234,245

UNITED STATES PATENT OFFICE 2,234,245

METALLIC COMPOSITION

Walter Henry Groombridge and John Edward Newns, Spondon, near Derby, England, assignors to Celanese Corporation of America, a corporation of Delaware No Drawing. Application November 26, 1938, Serial No. 242,562. In Great Britain December 9, 1937

8 Claims. (Cl. 23—214)

This invention relates to a novel metallic composition and is more particularly concerned with a metallic composition which is valuable as a reagent or catalyst in chemical processes in which iron in finely divided form is used as a reagent or catalyst.

According to the invention a mixture of finely divided iron and copper oxide is heated to induce reaction between the substances so as to form a product comprising a mass of cuprous oxide permeated with oxidised iron and this product is then subjected to reduction. In this way it has been found possible to produce a novel metallic composition which is of great value as a reagent or catalyst in chemical processes of the kind referred to above and especially in the manufacture of hydrogen from water. The invention includes compositions obtainable in this way, as well as the intermediate unreduced compositions, and also the use of the compositions as reagents or catalysts particularly in the decomposition of steam or water at elevated temperatures to produce hydrogen as for example in the Lane and Bergius processes.

In making the compositions the iron and copper oxide may be employed in about equal weights, although it is not necessary to adhere strictly to the use of such a mixture, and the two substances should be in a very fine state of sub-division, for instance the iron may be employed in the form of very fine filings or powder and the copper oxide as a finely ground powder.

The heating of the mixture to induce reaction between the substances is an important feature of the invention. After thorough mixing the substances should be heated to a temperature exceeding 600° C., temperatures between 750 and 1000° C., e. g. 850-900° C. usually being preferable. Under these conditions a "Thermite" type of process takes place, yielding a semi-fused or sintered mass comprising cuprous oxide permeated with oxidised iron. This product is hard but can be broken into particles or granules of a size suitable for use as a reagent or catalyst by an ordinary milling operation. After milling and grading the product is subjected to reduction and usually it is convenient to effect the reduction with a commercial hydrogen-carbon monoxide mixture such as water gas or producer gas. The reduction should not be carried out at such a high temperature as to cause fusion or excessive sintering and a reduction temperature between 500° and 800° C., e. g. 700° C., is preferred.

The reduced product, which is almost completely non-friable, consists of a structure of highly porous copper permeated with iron.

As has been indicated, the invention comprises, in addition to the novel metallic composition and its method of production, the use of the metallic composition as a reagent or catalyst in chemical processes. Of outstanding importance in this connection is the use of the composition in the production of hydrogen by decomposition of water at high temperatures, a process in which the metallic composition of the invention offers immense advantages, whether the hydrogen is produced from steam, as in the Lane process in which the iron is alternately oxidised with steam and regenerated with a reducing gas such as water gas or producer gas, or from liquid water, as in the Bergius process, in which liquid water is heated with iron under a high pressure to a temperature approaching the critical temperature of water.

The almost complete lack of friability of the novel metallic composition enables it to be subjected to repeated oxidation and regeneration in either type of process without deterioration and endows it with an unusually long life as compared with the iron-containing reagents or catalysts commonly used in the Lane type of process which have a life of only a few weeks; the iron-containing reagents or catalysts previously employed in the Bergius type of process are practically incapable of regeneration.

Moreover, the novel metallic composition has a very high content of "available" iron, i. e. iron which can take part in the chemical process in which it is employed, amounting to as much as five or six or more times the percentage of available iron present in known iron-containing reagents or catalysts, for instance those employed in the Lane process. The present invention thus makes it possible to increase considerably the production rate and/or the length of each "make" period, i. e. the period during which the iron reagent or catalyst is subjected to treatment with steam, in this type of process.

Furthermore, a highly porous nature, and hence a high surface: volume ratio, and a high thermal conductivity are valuable features of the novel composition.

The following example illustrates the production of a metallic composition according to the invention:

*Example 1*

An intimate mixture of equal parts by weight of copper oxide and iron powder is heated in a fire-clay crucible to about 900° C. The copper oxide is thereby reduced to the cuprous state with corresponding oxidation of the iron. The resulting substantially homogeneous mass is broken into pieces of from 1/8" to 1/4" mesh and reduced in a current of water gas at about 700° C.

The resulting composition is suitable for the production of hydrogen by the decomposition of steam as, for instance, in the Lane process or by the decomposition of water as, for instance, in the Bergius process.

The following example illustrates the use of the compositions of the invention in the production of hydrogen by the decomposition of steam.

*Example 2*

Each of a number of externally heated copper tubes is charged with about 700 gms. of the product of Example 1. The tubes are heated to 650–700° C. and steam is passed through the tubes at a rate corresponding to 50–65 gms. of water per hour per tube for 2 hours. During this period the amount of pure hydrogen produced corresponds to a 40–50% conversion on the steam passed.

The reaction mass is then reduced at about 700° C. by the passage of producer gas at the rate of 60 litres per hour for 4 hours.

The cycle is then repeated.

Water gas may be used in place of producer gas in the reduction. The cycle can be repeated a large number of times without any disintegration of the catalytic composition occurring.

Having described our invention, what we desire to secure by Letters Patent is:

1. Process for the production of a metallic composition suitable for use in the production of hydrogen from steam or water under the influence of heat, said process comprising heating to sintering temperature in a non-reducing atmosphere an intimate mixture of finely divided copper oxide and iron to bring about reduction of copper oxide to cuprous oxide by the iron and subjecting the resulting composition to the action of a reducing atmosphere to reduce the metallic oxides to the corresponding metals.

2. Process for the production of a metallic composition suitable for use in the production of hydrogen from steam or water under the influence of heat, said process comprising heating to sintering temperature in a non-reducing atmosphere an intimate mixture of finely divided copper oxide and iron to bring about reduction of copper oxide to cuprous oxide by the iron, breaking down the sintered composition to a suitable size and subjecting the resulting composition to the action of a reducing atmosphere to reduce the metallic oxides to the corresponding metals.

3. Process for the production of a metallic composition suitable for use in the production of hydrogen from steam or water under the influence of heat, said process comprising heating to sintering temperature in a non-reducing atmosphere an intimate mixture of finely divided copper oxide and iron in substantially equal proportions to bring about reduction of copper oxide to cuprous oxide by the iron and subjecting the resulting composition to the action of a reducing atmosphere to reduce the metallic oxides to the corresponding metals.

4. Process for the production of a metallic composition suitable for use in the production of hydrogen from steam or water under the influence of heat, said process comprising heating to sintering temperature in a non-reducing atmosphere an intimate mixture of finely divided copper oxide and iron in substantially equal proportions to bring about reduction of copper oxide to cuprous oxide by the iron, breaking down the sintered composition to a suitable size and subjecting the resulting composition to the action of a reducing atmosphere to reduce the metallic oxides to the corresponding metals.

5. Process for the production of hydrogen, which comprises decomposing steam by the action of heat in the presence of a metallic composition made by the process of claim 1.

6. Process for the production of hydrogen, which comprises decomposing steam by the action of heat in the presence of a metallic composition made by the process of claim 4.

7. Process for the production of hydrogen, which comprises decomposing liquid water by the action of heat in the presence of a composition made according to claim 1.

8. Process for the production of hydrogen, which comprises decomposing liquid water by the action of heat in the presence of a composition made according to claim 4.

WALTER HENRY GROOMBRIDGE.
JOHN EDWARD NEWNS.